United States Patent
Galstian et al.

(10) Patent No.: US 11,221,539 B2
(45) Date of Patent: Jan. 11, 2022

(54) LIQUID CRYSTAL BEAM CONTROL DEVICE GENERATING FLAT-TOP DISTRIBUTION

(71) Applicant: LensVector Inc., San Jose, CA (US)

(72) Inventors: Tigran Galstian, Quebec (CA); Karen Asatryan, Quebec (CA); Armen Zohrabyan, Quebec (CA); Vladimir Presniakov, Quebec (CA)

(*) Notice: Subject to any disclaimer, the term of this patent is extended or adjusted under 35 U.S.C. 154(b) by 0 days.

(21) Appl. No.: 16/334,059

(22) PCT Filed: Sep. 22, 2017

(86) PCT No.: PCT/CA2017/051117
§ 371 (c)(1),
(2) Date: Mar. 18, 2019

(87) PCT Pub. No.: WO2018/053640
PCT Pub. Date: Mar. 29, 2018

(65) Prior Publication Data
US 2019/0310532 A1      Oct. 10, 2019

Related U.S. Application Data

(60) Provisional application No. 62/398,158, filed on Sep. 22, 2016.

(51) Int. Cl.
*G02F 1/29* (2006.01)
*G02B 27/09* (2006.01)
(Continued)

(52) U.S. Cl.
CPC ............ *G02F 1/292* (2013.01); *F21V 14/003* (2013.01); *G02B 27/095* (2013.01);
(Continued)

(58) Field of Classification Search
CPC ..... G02F 1/292; G02B 27/286; G02B 27/095; G02B 27/0927; G03B 21/142; G03B 21/28
(Continued)

(56) References Cited

U.S. PATENT DOCUMENTS

| 6,005,650 A | 12/1999 | Kim et al. |
| 10,126,607 B2 | 11/2018 | Presniakov et al. |

(Continued)

FOREIGN PATENT DOCUMENTS

| CN | 101675379 A | 3/2010 |
| CN | 101055400 B | 12/2011 |

(Continued)

OTHER PUBLICATIONS

Chinese application No. 201680050049.5 Office Action dated Jan. 10, 2020.
(Continued)

*Primary Examiner* — Charles S Chang
(74) *Attorney, Agent, or Firm* — Anglehart et al.

(57) ABSTRACT

A lighting device using a liquid crystal beam modulator produces good broadening of a light beam. The liquid crystal cell has a patterned electrode structure having a pattern of paired electrodes on a first one of a pair of cell substrates for providing a spatially modulated electric field extending into a liquid crystal material, and the cell is arranged with respect to a light source so that an incident beam will arrive through another of the pair of substrates and exit from the first one of the pair of substrates.

24 Claims, 6 Drawing Sheets

(51) Int. Cl.
*F21V 14/00* (2018.01)
*G02B 27/28* (2006.01)
*G03B 21/14* (2006.01)
*G03B 21/28* (2006.01)

(52) U.S. Cl.
CPC ....... *G02B 27/0927* (2013.01); *G02B 27/286* (2013.01); *G03B 21/142* (2013.01); *G03B 21/28* (2013.01)

(58) Field of Classification Search
USPC .......................................................... 349/141
See application file for complete search history.

(56) References Cited

U.S. PATENT DOCUMENTS

| | | | |
|---|---|---|---|
| 2003/0001993 A1* | 1/2003 | Iijima | G02F 1/13362 349/113 |
| 2005/0140905 A1* | 6/2005 | Yang | G02F 1/133528 349/141 |
| 2007/0076150 A1 | 4/2007 | Hale et al. | |
| 2007/0077372 A1 | 4/2007 | Chung | |
| 2008/0198280 A1 | 8/2008 | Hikmet et al. | |
| 2008/0205075 A1* | 8/2008 | Hikmet | G02B 3/14 362/488 |
| 2008/0284924 A1* | 11/2008 | Hofmann | F21V 14/003 349/5 |
| 2010/0148688 A1 | 6/2010 | Hikmet et al. | |
| 2010/0149444 A1* | 6/2010 | Hikmet | G02F 1/29 349/15 |
| 2010/0165618 A1 | 7/2010 | Vissenberg et al. | |
| 2010/0208185 A1 | 8/2010 | Van BOmmel et al. | |
| 2010/0221459 A1 | 9/2010 | Chung | |
| 2014/0125934 A1 | 5/2014 | Naganuma et al. | |
| 2015/0153580 A1 | 6/2015 | Fang | |
| 2015/0268495 A1 | 9/2015 | Kzak et al. | |
| 2015/0316820 A1 | 11/2015 | Duston et al. | |
| 2016/0041449 A1 | 2/2016 | Clark et al. | |
| 2016/0252235 A1 | 9/2016 | Benner et al. | |
| 2017/0269453 A1* | 9/2017 | Galstian | G02F 1/1337 |

FOREIGN PATENT DOCUMENTS

| | | |
|---|---|---|
| CN | 204188912 U | 3/2015 |
| DE | 19829226 A1 | 1/1999 |
| JP | 3432293 B2 | 8/2003 |
| TW | 200722871 A | 6/2007 |
| WO | 2014105814 A1 | 7/2014 |
| WO | 2014138974 A1 | 9/2014 |
| WO | 2017/041167 A1 | 3/2017 |
| WO | 2018/053640 A1 | 3/2018 |

OTHER PUBLICATIONS

European application No. 16843322.5 supplementary partial search report dated Jul. 17, 2019.
International application No. PCT/CA2016/050589 International Preliminary Report on Patentability Chapter I dated Mar. 13, 2018.
International application No. PCT/CA2016/050589 International Search Report dated Sep. 14, 2016.
International application No. PCT/CA2016/050589 Search Strategy dated Sep. 14, 2016.
International application No. PCT/CA2016/050589 Written Opinion of the International Searching Authority dated Sep. 14, 2016.
Taiwan application No. 105129479 Office Action dated Oct. 17, 2019.
U.S. Appl. No. 15/757,471 Office Action dated Oct. 2, 2019.
International Search Report dated Jan. 15, 2018 for parent application No. PCT/CA2017/051117.
Written Opinion of the International Searching Authority dated Jan. 2, 2018 for parent application No. PCT/CA2017/051117.
Related European patent application No. 16843322.5 European examination report dated Jun. 19, 2020.
Related Chinese application No. 201680050049.5 office action dated Mar. 16, 2021.
Related Chinese application No. 201680050049.5 office action dated Sep. 1, 2020.
Related U.S. Appl. No. 15/757,471 Office Action dated Oct. 2, 2019.
Related U.S. Appl. No. 15/757,471 Office Action dated Jul. 7, 2020.
Related U.S. Appl. No. 16/151,761 Office Action dated Feb. 28, 2020.
Related U.S. Appl. No. 16/151,761 Office Action dated Aug. 13, 2020.
Related U.S. Appl. No. 16/151,761 Office Action dated Dec. 21, 2020.
Related International application No. PCT/CA2018/050472 International Preliminary Reporton Patentability Chapter I dated Oct. 22, 2019.
Related International application No. PCT/CA2018/050472 International Search Report dated Jul. 27, 2018.
Related International application No. PCT/CA2018/050472 Written Opinion of the International Searching Authority dated Jul. 27, 2018.
Related European patent application No. 18787815.2 extended European search report dated Dec. 9, 2020.

* cited by examiner

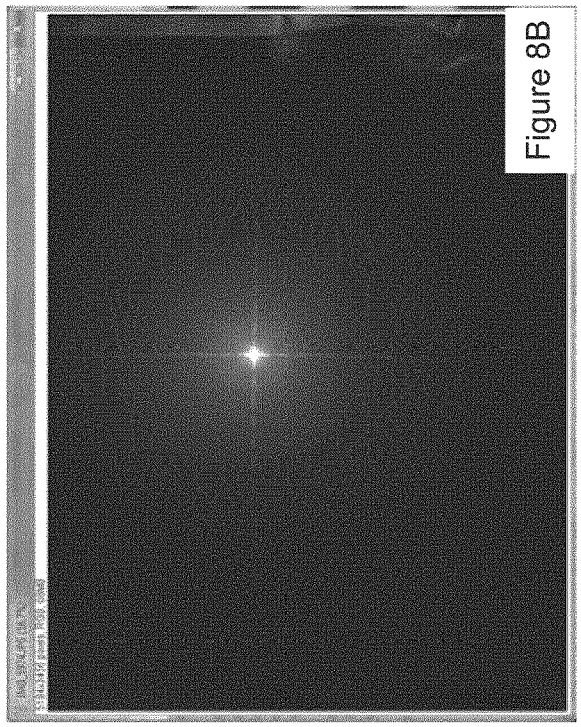
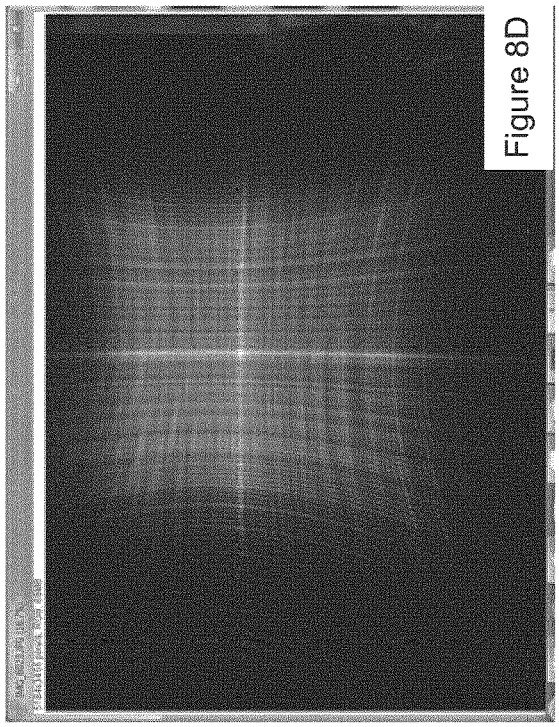
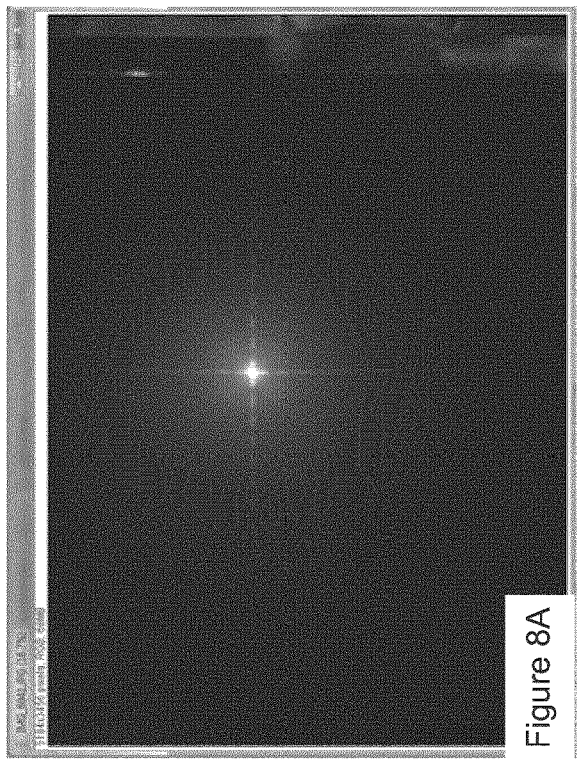
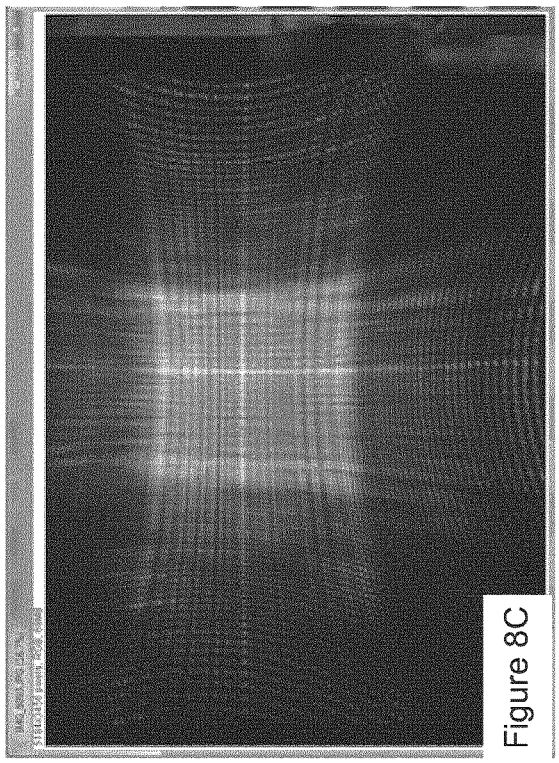
Figure 8A
Figure 8B
Figure 8C
Figure 8D

LIQUID CRYSTAL BEAM CONTROL DEVICE GENERATING FLAT-TOP DISTRIBUTION

This application claims priority of U.S. provisional patent application 62/398,158 filed Sep. 22, 2016.

TECHNICAL FIELD

This application relates to the field of liquid crystal beam control devices.

BACKGROUND

Adjustable beam divergence is available using motor-controllable reflectors and/or lenses in the performance arts industry, while such light projectors are not generally applied to office and home interior lighting. In architectural lighting, light bulbs provide beams of a fixed divergence from narrow spot beams to broad diffuse beams. In the case of spot beams, the beam intensity angular distribution from spot beam light bulbs is typically close to Gaussian. This leaves a concentrated spot of light that is brighter at its center and some residual light at greater angles that fades gradually in intensity. With broad diffuse beams, it is preferred that the central portion of the beam has an even intensity with any visible "hot spots" that attract the attention of the eye. This is achieved using reflectors and diffusers to direct the light from the light bulb to create the diffuse beam.

Beam divergence control using liquid crystal devices is known in the art. Such devices have the promise of dynamic beam divergence control. However, it is extremely difficult to dynamically generate a broadened light beam with relatively flat central distribution of light intensity in the center of the beam when the original beam has more or less Gaussian distribution.

SUMMARY

Applicant has found that liquid crystal beam control devices have different abilities to modulate the divergence of a light beam depending on the direction of light propagation (i.e. forward along the optical axis of the system versus backward) and the initial divergence of the light beam entering the liquid crystal device. One such difference is that beam divergence is greater in one direction. Furthermore, an initial beam divergence of appropriate value can greatly improve the ability of such a device to control further beam divergence while reducing color separation. Finally, the addition of static or dynamic (electrically variable) scattering optical elements (such as static diffusors, polymer dispersed or polymer stabilized liquid crystals) may further improve the beam quality by homogenizing the intensity and color distribution of the transmitted light.

Applicant has also found that the beam intensity angular distribution modulation is different depending on the direction of light propagation (i.e. forward along the optical axis versus backward). Applicant has observed that in one direction of propagation, the near Gaussian angular distribution of intensity is substantially maintained as the beam is broadened, while in the opposite direction of propagation, the near Gaussian angular distribution of intensity entering the device is broadened by the device to have a relatively "flat top", namely a more consistent intensity angular distribution about the optic axis for a wider angular portion of the beam than is observed for the opposite direction of propagation.

A lighting device using a liquid crystal beam modulator produces good broadening of a light beam. The liquid crystal cell has a patterned electrode structure having a pattern of paired electrodes on a first one of a pair of cell substrates for providing a spatially modulated electric field extending into a liquid crystal material, and the cell is arranged with respect to a light source so that an incident beam will arrive through another of the pair of substrates and exit from the first one of the pair of substrates.

In some embodiments, a lighting device comprises a light source for producing an incident beam, at least one liquid crystal cell for modulating the incident beam as the incident beam propagates therethrough, the liquid crystal cell having: a pair of cell substrates separated by a cell thickness, a liquid crystal material filling, at least one alignment layer for ordering the liquid crystal material with a director in an in-plane ground state alignment direction, and a patterned electrode structure having a pattern of paired electrodes on a first one of the pair of substrates for providing a spatially modulated electric field extending into the liquid crystal material, and wherein the cell is arranged with respect to the light source so that the incident beam will arrive through a second one of the pair of substrates and exit from the first one of the pair of substrates.

In some embodiments, the device may further comprise at least one primary optics element positioned between the source and the cell to transform the original light divergence before it enters into the liquid crystal cell. In some embodiments, the device may further comprise a secondary optics element positioned between the cell and the output space. In some embodiments, the primary optics element may be a reflector. In some embodiments, the secondary optics element may be a static diffuser. In some embodiments, the secondary optics element may be a dynamic LC controllable diffuser.

In some embodiments, the device may comprise two of such LC cells cross oriented and arranged with parallel patterns of paired electrodes for modulating two orthogonal polarizations of incident light in one output plane.

In some embodiments, the device may comprise four of such cells cross oriented and arranged for modulating two orthogonal polarizations of incident light in two output planes.

In some embodiments, the at least one alignment layer of each one of the liquid crystal cells is arranged at or about at a 45 degree angle with respect to a direction of the pattern of paired electrodes.

In some embodiments, the pattern of paired electrodes comprises parallel strip electrodes.

In some embodiments, there is provided a beam modulator for use with a lighting device comprising a light source for producing an incident beam, the modulator comprising a mounting compatible with the light source for mounting with a first side of the mounting to receive the incident beam and at least one liquid crystal cell as described above mounted to the mounting for modulating the incident beam as the incident beam propagates therethrough.

BRIEF DESCRIPTION OF THE DRAWINGS

The invention will be better understood by way of the following detailed description of embodiments of the invention with reference to the appended drawings, in which:

FIGS. 8A to 8D illustrate the projected beam using a configuration according to FIG. 2 in which the four cell design of FIG. 4 is used to modulate both polarizations and both directions and the beam is observed on a screen at about 1 meter.

DETAILED DESCRIPTION

Figure 1:
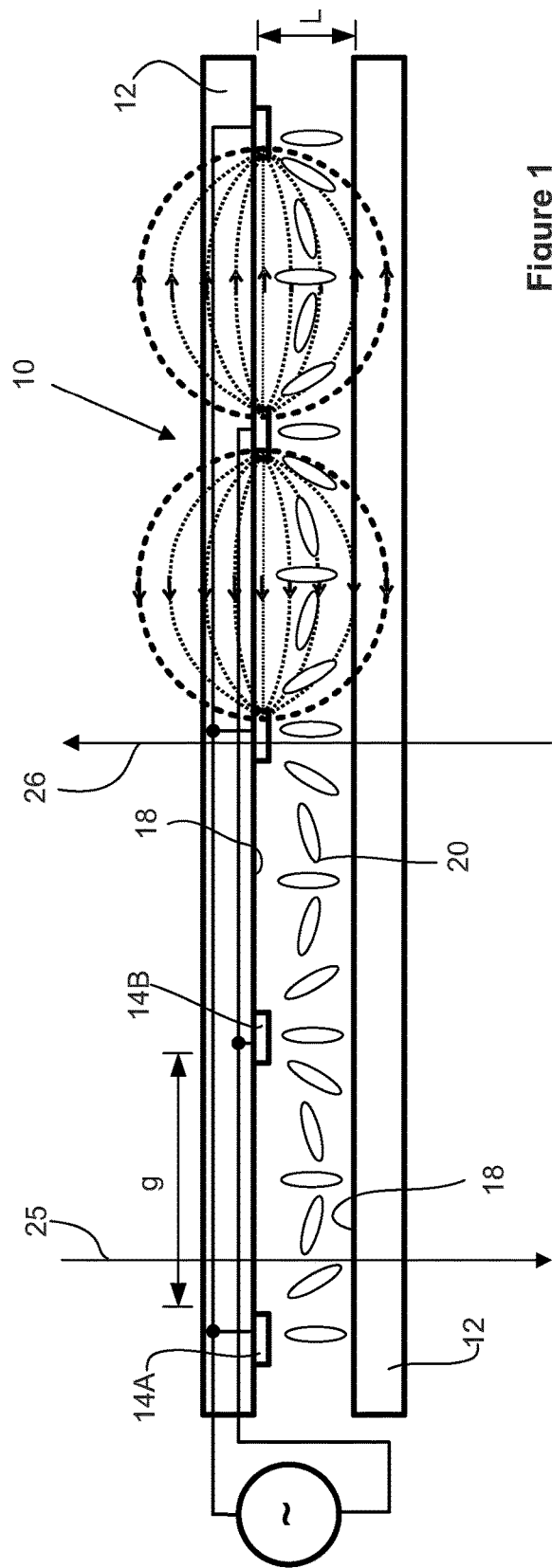
FIG. 1 is schematic cross section diagram of a liquid crystal beam shaping device having in-plane control electrodes on one substrate.

Beam control devices are optical devices which generate and control a (refracted) output beam of light either with respect to the beam divergence (simple broadening) or with respect to the beam direction (orientation). Controlled beam divergence/convergence is a special case of beam control providing beam focusing/defocusing. Beam direction control can be employed for beam steering purposes. Beam control devices which provide a combination of beam diffusion, beam divergence/convergence or beam direction control are generally referred to herein as beam shaping devices.

In liquid crystal beam control devices, an electric field is typically used to control a molecular orientation of liquid crystal material in a LC cell. The electric field can be spatially modulated over the aperture of a liquid crystal optical device to spatially modulate the orientation of liquid crystal molecules (the local anisotropy axis or the "director"). The change in molecular orientation affects the local index of refraction of the LC material and can create a refractive index gradient in the LC material throughout the LC cell volume. In a particular case, particular refractive index gradient variations can create what is known as gradient index (GRIN) lensing (including focusing or defocusing lensing). For moderate aperture lenses, it can be desirable to have a (controlled) smooth variation of LC molecular orientation over the aperture, without using numerous lens elements to form a lens of an extended aperture.

When the aperture of the beam control device is large, beam steering at large angles is difficult with a liquid crystal GRIN device due to relatively small variations in the index of refraction typically provided over the single aperture. By using a number of beam control elements having small active apertures over an effective larger aperture, smaller optical elements with a smaller aspect ratio (form factor) can provide greater overall beam steering ability. In the case of beam shaping devices, the use of a number of elements can be desirable and the profile of the electric field over the small aperture area of each beam shaping element and its interaction with the adjacent (shared) liquid crystal (material layer) can be different from that of larger aperture devices. In some implementations of the proposed solution, employing small form factor beam device elements can provide improved beam shaping, for example beam broadening.

In some beam control devices, the controlling electric field is provided using electrodes arranged on opposed sides of the liquid crystal layer, and in others, the electric field is provided by electrodes arranged on a single one substrate adjacent (containing/sandwiching) the liquid crystal layer.

Nematic liquid crystal when oriented in a ground state using a rubbed alignment layer (for in plane alignment) can affect only one polarization component of incident unpolarized light. To modulate unpolarized light, a single layer of locally isotropic liquid crystal layer (such as stabilized blue phase) or two, orthogonally oriented, layers of nematic liquid crystal (NLC) are commonly used. Natural or unpolarized light being represented with the help of two orthogonal polarizations, only one of the polarizations will be modulated by the first NLC layer (in accordance with its liquid crystal spatial modulation), while the other polarization component will essentially be unmodulated by that NLC layer. The second NLC layer arranged to provide the desired complementary modulation on the polarization unmodulated by the first NLC layer, lets the polarization modulated by the first NLC layer pass through with little negligible modulation.

For specific beam shaping purposes, it is possible to program such liquid crystal double layer geometry, to also broaden an unpolarized light beam in one or two perpendicular azimuthal planes (intersecting along the normal). Thus in one possible implementation the first liquid crystal layer can be employed to controllably spread light of one polarization in one direction, while a second liquid crystal layer can be employed to controllably spread light of the other polarization in an orthogonal direction. Alternatively, the first liquid crystal layer can be employed to controllably spread light of one polarization in two orthogonal planes, while a second liquid crystal layer can be employed to controllably spread light of the other polarization in the same two orthogonal planes.

For example, the configuration of FIG. 1 can provide devices that provide no light modulation under conditions of zero power, and then provide beam spreading or divergence when powered. Reference is also made to Applicant's PCT patent application publication WO2017/041167 published on 16 Mar. 2017.

FIG. 1 shows a beam control device having a single liquid crystal layer 20 that has, on one (top) substrate 12, independent electrodes 14A and 14B separated by gaps g to provide a control electric field between electrodes 14a and 14B that is spatially variable in the volume of liquid crystal material below each gap g. When a control signal having a voltage is applied across electrodes 14A and 14B (see the field lines illustrated on the two rightmost cells), the electric field follows a geometry oriented essentially parallel to the (separation) direction between the electrodes 14A and 14B at a midpoint of each gap g, while the orientation of the electric field lines turns to be essentially perpendicular to the (separation) direction between the electrodes 14A and 14B near (at) the edges of each gap g.

In FIG. 1, the aspect ratio (R) of the electrode spacing (g) and its width w (e.g., w=10 micrometers) or the pitch or the period between the electrodes 14A and 14B (p=g+w), and the thickness of the liquid crystal layer (L), R=p/L, can be, for example, between 0.5 and 2 (preferably about 1 for a microlens array application) without using any weakly conductive material coating on or at the insulating substrate 12 on which the electrodes 14A and 14B are provided (located). For example, the electrode gap spacing g can be about 35 micrometers, while the LC layer thickness L can be about 40 microns for an aspect ratio of about 1.1. The width of the strip electrode 14A, 14B can be relatively small. The aspect ratio R has been found to play an important role in determining the desired electric field spatial variation as described above. The electrodes 14A and 14B are shown arranged on a LC cell inside side of the substrate 12, however, electrodes 14A and 14B can also be located on an outside side of the substrate 12. This latter arrangement may require a higher drive signal voltage, however, the electric field geometry can be different and perhaps better suited for modulating the electric field within the liquid crystal material volume for some applications.

In the embodiment illustrated in FIG. 1, close to electrodes, the electric field has components that are essentially "vertical" ("out of plane"), namely perpendicular to the substrate 12 at which the electrodes 14A and 14B are located, and are essentially "horizontal", namely extending between the electrodes 14A, 14B parallel to the cell substrates 12 (in the electrode gaps).

When the liquid crystal material is oriented in its ground state by an alignment layer 18 defining a pretilt angle that provides initial (preferential) in-plane molecular orientation extending (in the direction) between the electrodes 14A and 14B (perpendicular to the electrode strips), an asymmetry is expressed (occurs in) the output broadened beam intensity due to the pretilt angle. The pretilt angle of the alignment layer 18 generates an asymmetric local orientation difference between the electric field and the desired spatial distribution of orientation of the liquid crystal in the LC cell. As illustrated in FIG. 1, the left side orientation of liquid crystal at 20 is aligned with the electric field, while the right side orientation of the liquid crystal at 20 is likewise aligned in the opposed direction with the field, however with a planar alignment of the liquid crystal in the ground state, some asymmetric variation will occur.

The strip electrodes 14A and 14B can be sufficiently narrow enough so as to reduce the size of the boundary zone between adjacent cells. The overall device aperture having a LC cell illustrated in FIG. 1 can have many such (cells) control elements, whether arranged in strips, rings, spirals or other geometric patterns, for a small electrode gap g of each control element (cell) of about 30 microns to about 90 microns, and typically around 50 microns, about 20 control elements (cells) per linear millimeter of aperture can be provided.

Figure 2:
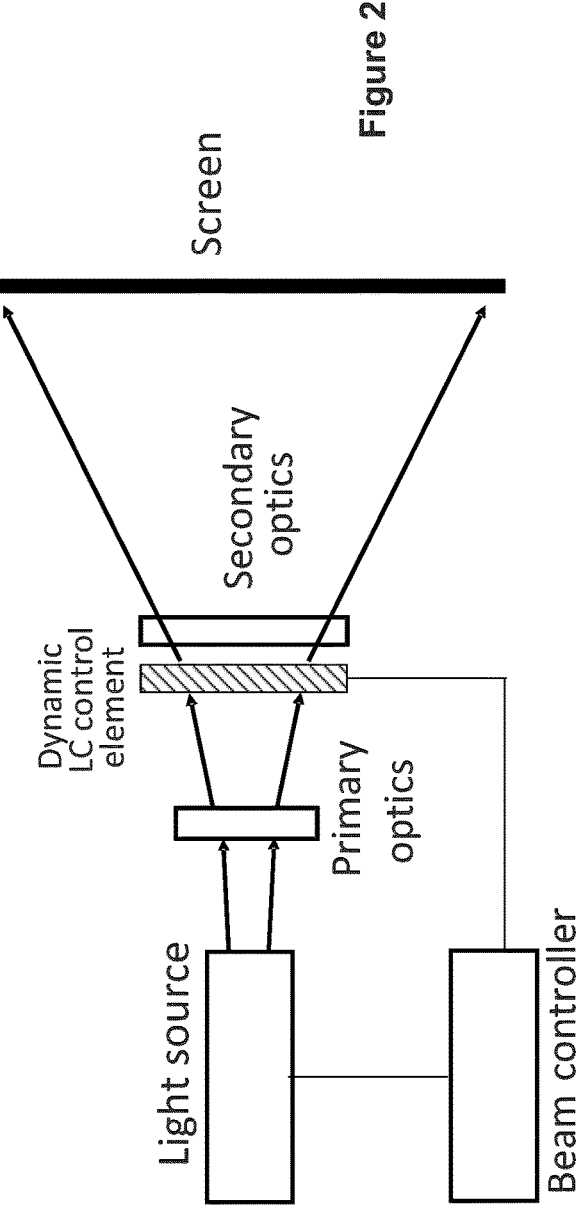
FIG. 2 is a schematic diagram of a beam control lighting device projecting the beam of a light source onto a screen.

FIG. 2 schematically shows an experimental setup in which a light source providing a spot beam of low divergence is passed through a primary optics element (such as reflector, diverging lens, diffractive optical element or diffuser) to add a small amount of additional divergence prior to entering the LC element 10. This element is optional, and may add little benefit when the light source already provides a certain amount of "original" divergence, such as +/−7.5 degrees (15 degrees at full width at half maximum or FWHM). In the embodiment of FIG. 2, the light source may be a Light Emitting Diode (LED) based light source (example, the CREE LED light module MR16). However, other light sources with appropriate original divergence may be used. In the case of CREE LED used, a primary optical element is not necessary here. However, an additional (secondary) optics element (a diffuser that provides about 2 degrees of additional diffusion) is added after the liquid crystal beam control element to improve the output beam's quality (by reducing the undesired intensity distribution abrupt changes and color separation). Optionally, the diffuser can be a controllable device, such as an electrically controllable PDLC or PSLC diffuser element, such that the beneficial diffusion provided to the element 10 can be removed to have a tighter spot beam, while having a fully adjustable level of diffusion in the incident beam.

The liquid crystal ground state orientation may be essentially in the plane of substrates (except the pretilt angle) at certain angle (e.g., ±45 degrees) with respect to the electrode strips. If this ground state orientation is in a direction extending between the electrodes 14A and 14B (perpendicular to electrode strips), then it can be in the origin of an asymmetry of director reorientation profile in response to the electric field. In addition, the chromatic dispersion of the created microlenses may be rather large. These problems may produce a visible distortion in the transmitted light, such as a color separation effect produced when a multi-finger strip electrode arrangement as per FIG. 1 receives a collimated incident light beam. In this case, the broadening is not perfectly centro-symmetric, the broadening angle is modest, there will be bright spots in light intensity distribution and chromatic dispersion generating rather visible color separation.

It will be appreciated that the LC element 10 can be integrated into a mounting compatible with the light source for mounting with a first side of the mounting to receive the incident beam. The mounting can be structured to connect with the light source exclusively so that beam direction is in direction 26 (of FIG. 1) and not in direction 25 (of FIG. 1). The mounting can integrate, if desired an electrical connector for connecting to a beam controller as shown in FIG. 2.

The mounting can also integrate the primary optics, or alternatively the primary optics can be associated with the light source. The mounting can integrate the secondary optics if desired. The mounting of the LC element 10 can be connected to the light source as a component to form a working lighting device.

Figure 3:
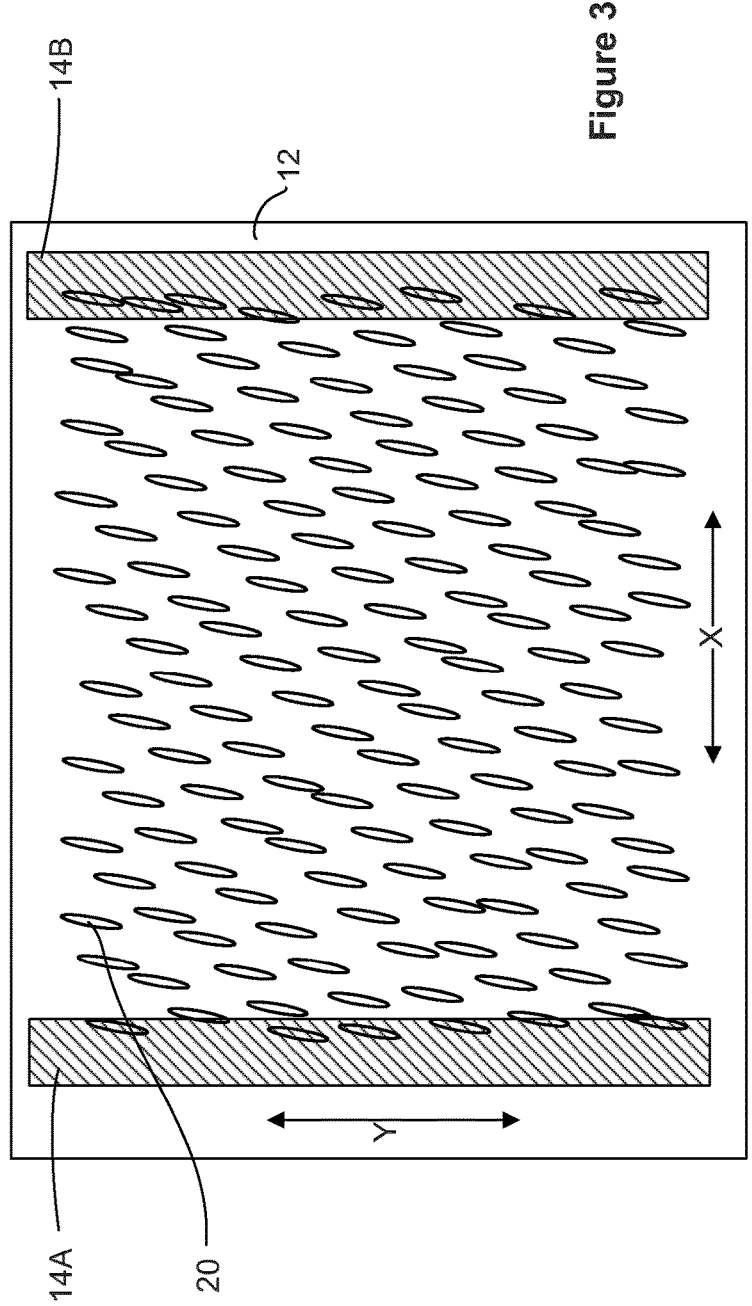
FIG. 3 is a schematic diagram illustrating a plan view of a beam control element according to FIG. 1 in which in-plane liquid crystal alignment is substantially parallel to the strip electrodes in accordance with one of the proposed solutions.

In FIG. 3, there is schematically illustrated in plan view an alternate configuration in which the (in-plane) orientation of the alignment layer 18 is almost parallel of the strip electrodes 14A and 14B. In this configuration, the electric field component in the (horizontal) X direction would act on the LC molecules to turn them sideways against the (restorative orienting) action of the alignment layer 18. However, the (vertical) or Y direction component of the electric field acts on the liquid crystal molecules 20 with good symmetry across the gap. This configuration provides good beam broadening symmetry, with little or no chromatic dispersion and the intensity distribution is desirably broad and smooth (with good uniformity).

Figure 4:
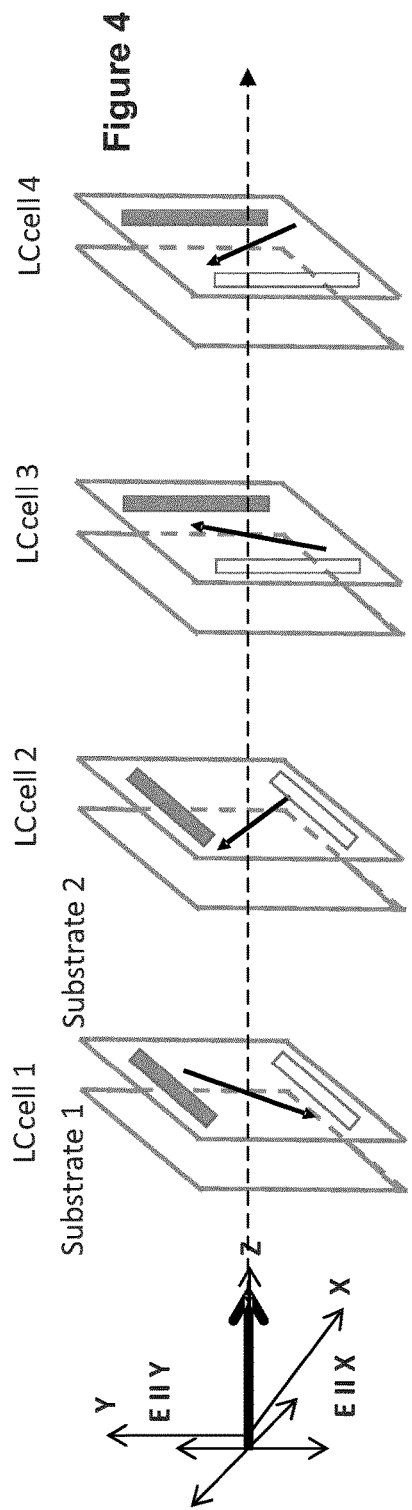
FIG. 4 is a schematic diagram illustrating a beam control device having four LC cells arranged to provide dual polarization operation and two direction (along two azimuthal planes) beam control, configuration in which the in-plane liquid crystal orientation is substantially arranged at ±45 degrees to the orientation of the strip electrodes in accordance with the proposed solution.

In accordance with an embodiment of the proposed solution the in-plane alignment orientation of the liquid crystal can be provided at roughly a 45 degree angle to the direction of the electrodes 14. Such a layered geometry is schematically illustrated in FIG. 4 for beam control for two directions (azimuthal planes) and for both polarizations. While the chromatic aberration or color separation reduction is not as good as in the embodiment illustrated in FIG. 3, for the embodiment illustrated in FIG. 4, when the direction of alignment is at 45 degrees with respect to the direction of the strip electrodes 14A and 14B, the problem of color separation is greatly reduced.

It will be appreciated that when beam control is only required in one direction, two cells having cross oriented directors and parallel electrodes can be used.

Experimental and simulation calculations have demonstrated that the liquid crystal within the cell of FIG. 1 has a different modulation of an incident beam depending on the direction of the incident beam, namely 25 or 26.

Figure 5:
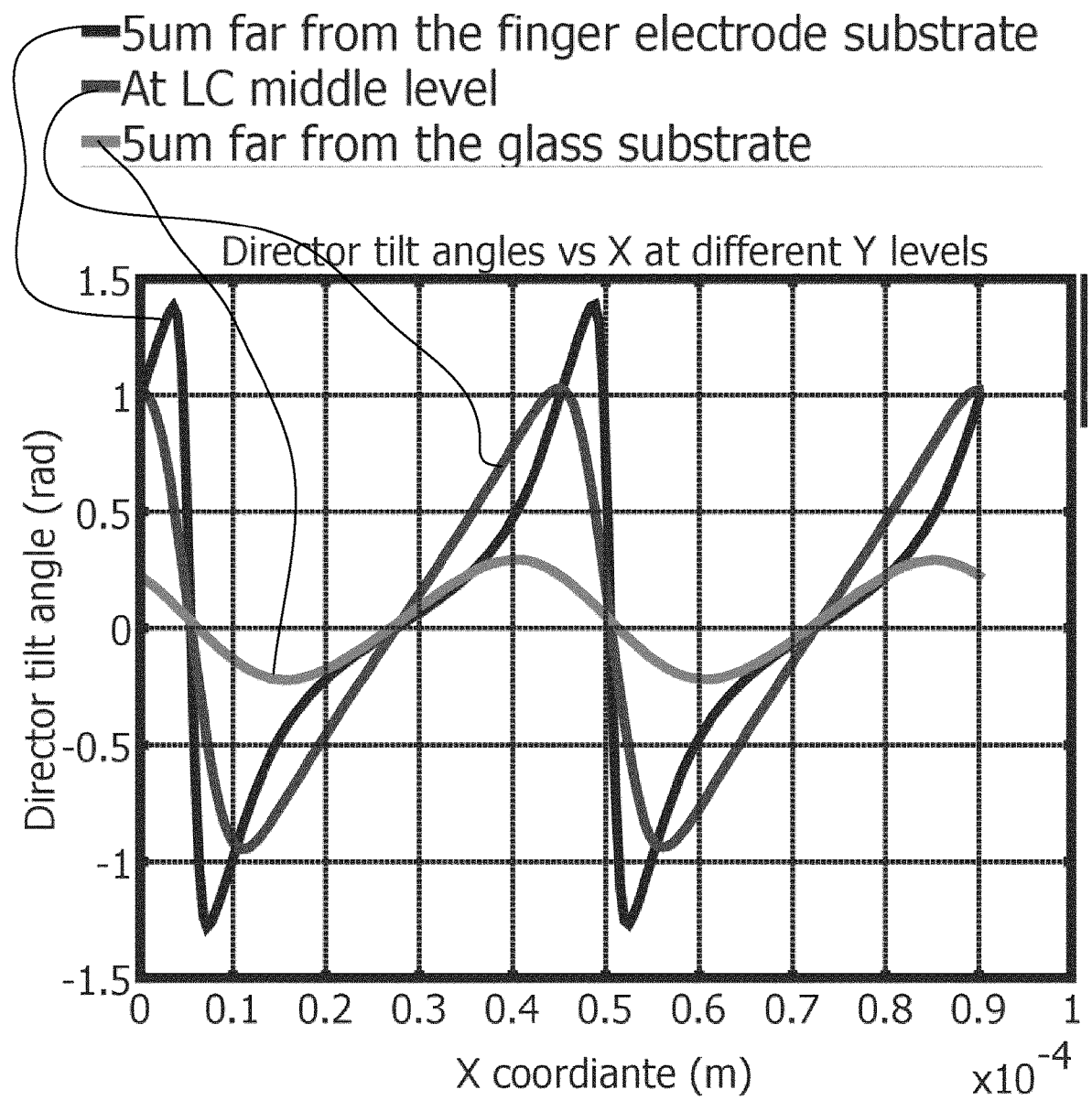
FIG. 5 is a plot of simulation results for the director tilt angle for three distances from the substrates for the configuration of FIG. 1.

Some of these discovered effects can be understood with reference to FIG. 1 and to FIG. 5. Indeed, due to the asymmetry of the LC cell (electrodes are disposed only on one of cell substrates) the electric field profile is different close to top (with electrodes) and bottom (without electrodes) substrates. Consequently, the perturbation of the LC is not the same in those zones. FIG. 5 shows how the liquid crystal orientation varies between the electrodes 14A and 14B (the X direction) in the configuration of FIG. 1 at different levels or distances between the substrates (the Y direction), namely at a distance of 5 micrometers from the finger electrode substrate, in the middle of the cell and at 5 micrometers from the non-electrode substrate, eg. made of glass. Thus, FIG. 5 shows the tilt angle of LC molecules close to top and bottom substrates as well as in the middle of the LC cell. Given that the LC is an anisotropic material, the propagation of light (phase, polarization, etc.) in this material is very sensitive to the local orientation of LC molecules. Thus, the above-mentioned difference (in tilt angles) becomes a cause of modification of the phase and of the polarization of light propagating in the LC. Consequently, an incident beam of light propagating in direction 26 experiences a different sequence of transformation compared to the light propagating in direction 25. Apparently such property variations express large measurable output beam variations observed here.

Figure 6A:
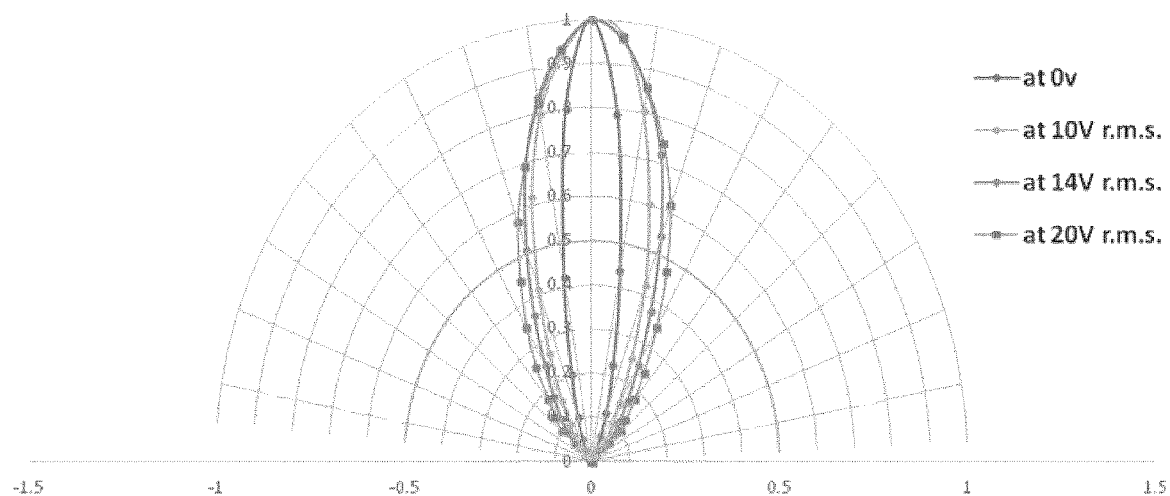
FIG. 6A is a polar intensity angular distribution plot obtained experimentally using a device as illustrated in FIG. 2 for the direction of propagation 25 of FIG. 1.
Figure 6B:
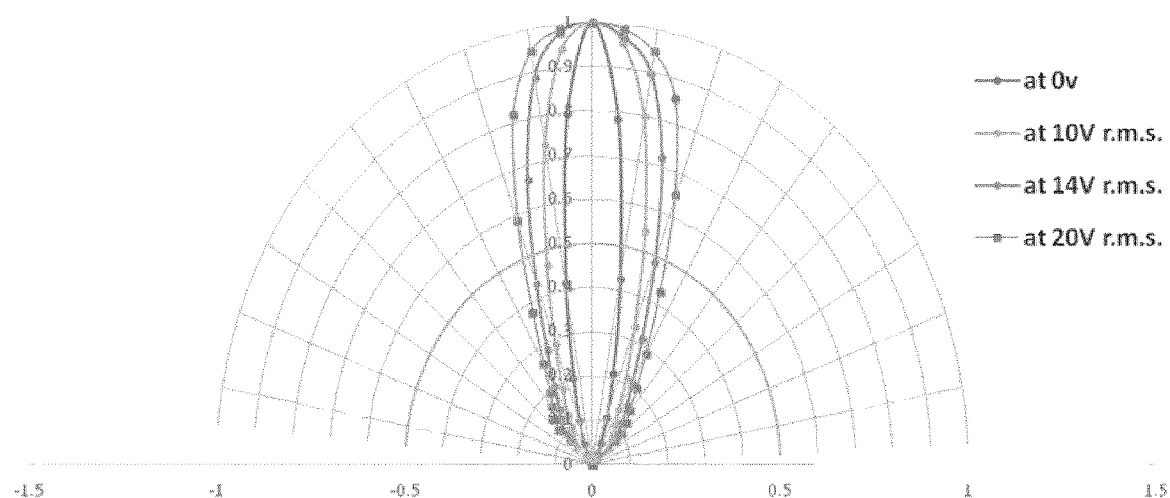
FIG. 6B is a polar intensity angular distribution plot obtained experimentally using a device as illustrated in FIG. 2 for the direction of propagation 26 of FIG. 1.
Figure 7A:
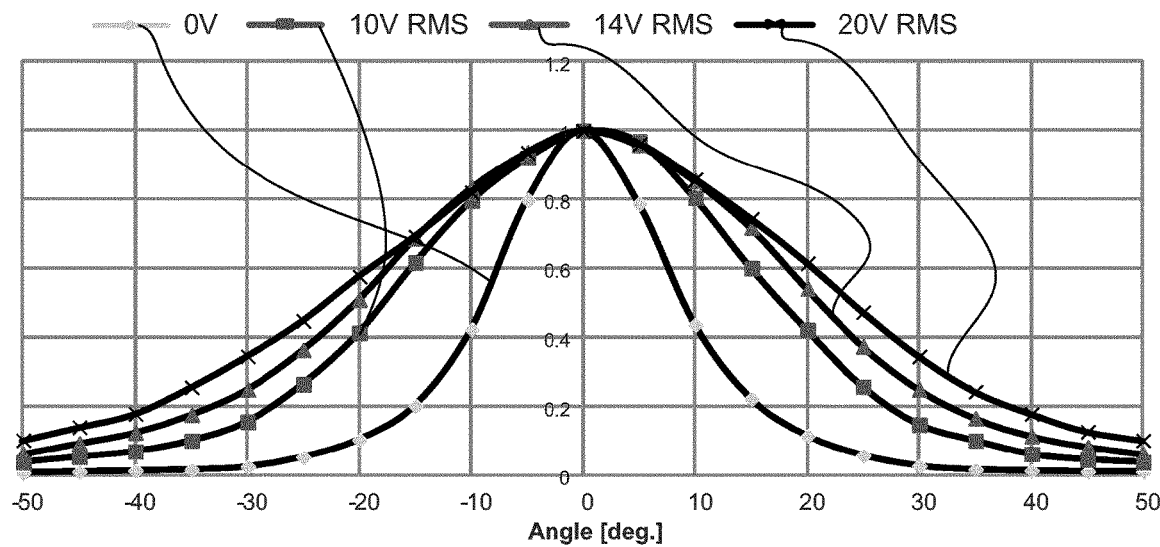
FIG. 7A is an intensity angular distribution plot obtained experimentally using a device as illustrated in FIG. 2 for the direction of propagation 25 of FIG. 1.
Figure 7B:
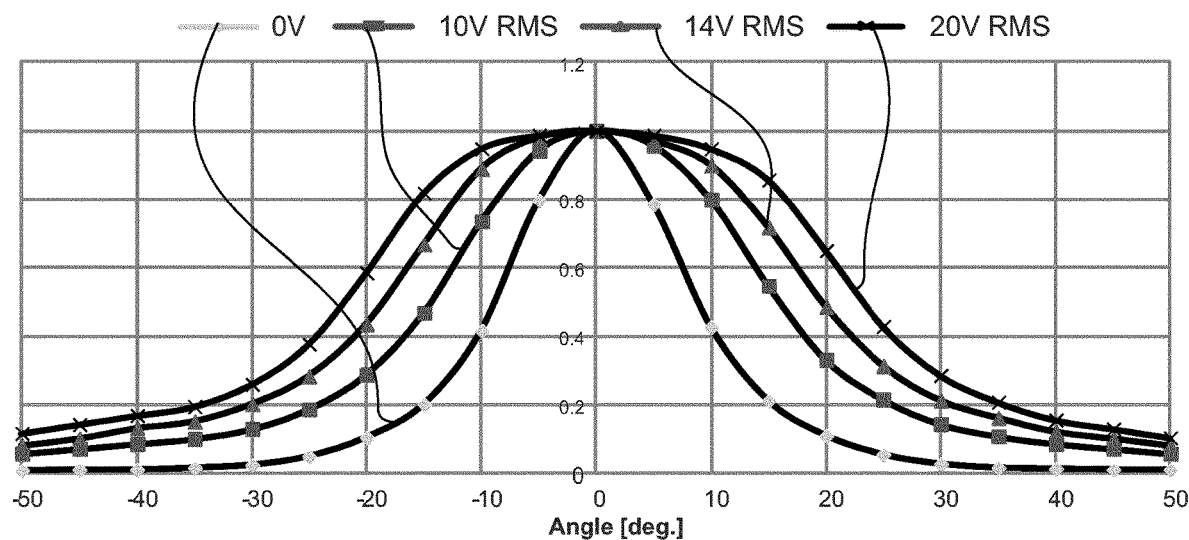
FIG. 7B is an intensity angular distribution plot obtained experimentally using a device as illustrated in FIG. 2 for the direction of propagation 26 of FIG. 1.

FIGS. 6A and 6B show polar plots of the same incident beam broadened by a beam broadening device having a patterned electrode structure similar to that illustrated in FIG. 1 with a large number of interdigitating (finger) strip electrodes 14A, 14B and therefore a large number of control elements. FIGS. 7A and 7B show the angular intensity distribution corresponding to the polar plots of FIGS. 6A and 6B respectively. The projected beam intensity distributions shown in FIGS. 6A and 6B correspond to light beam propagation traversing the LC cell in direction 25 and 26 respectively (see FIG. 1).

As can be seen, Applicant has discovered that the incident beam is broadened more when propagating in direction 25 than when propagating in direction 26, however, surprisingly, the beam angular intensity distribution has a more suitable "flat top" in direction 26 than in direction 25 in spite of the reduced angular spread of the light. It has also been observed that when the liquid crystal orientation is of different in-plane orientation, the same preferential effect for the propagation direction 25 over propagation direction 26 is present.

FIGS. 8A to 8D illustrate the projected beam using a configuration according to FIG. 2 in which the four cell design of FIG. 4 is used to modulate both polarizations and both directions and the beam is observed on a screen at about 1 meter. For the test, the wavelength chosen was 543 nm of circularly polarized light. FIG. 8A shows the projected beam through the electrode free side of the LC beam control device (as per FIG. 4) in the ground state, namely at 0 V. FIG. 8B shows the projected beam through the electrode side of the LC beam control device (opposite direction than that shown in FIG. 4) in the ground state, namely at 0 V. No apparent difference in the projected beams can be seen in the ground state. When 20V is applied to the experimental device, two different project beams can be seen depending on the side of the LC device through which the incident beam passes. In FIG. 8C, the central portion of the projected beam has a more uniform intensity, thus the above-described flat top. This is the result for the incident beam passing first through the cell from the non-electrode substrate. FIG. 8D shows the other direction in which the projected beam in which the modulated beam maintains more of the Gaussian intensity distribution of the incident beam. The projected beam has some greater angular broadening, however, the center is a hot spot.

Implementations of the proposed solution for shaping light of different polarizations can be done, for example, by using pairs of orthogonally orientated layers of liquid crystal. Thus a beam control device can be configured to control unpolarized light by employing two layers of orthogonally aligned liquid crystal. Alternatively, two layers of the same LC alignment can be arranged with a 90-degree polarization rotation device provided between the two layers. A patterned electrode array as described with reference to FIG. 1 can be used to broaden an incident beam in one direction or azimuthal plane. To broaden the beam in two directions (along two azimuthal planes), additional LC layer pairs can be used.

What is claimed is:

1. A lighting device comprising:
    a light source for producing an incident beam;
    at least one liquid crystal cell for modulating said incident beam as said incident beam propagates therethrough, said liquid crystal cell having:
        a first cell substrate having an electrode structure and a second cell substrate without an electrode structure, the first and second cell substrates being separated by a cell thickness,
        a liquid crystal material filling, and
        at least one alignment layer for ordering said liquid crystal material with a director in an in-plane ground state alignment direction,
        wherein the electrode structure comprises a patterned electrode structure having a pattern of paired electrodes for providing a spatially modulated electric field extending into said liquid crystal material; and
    wherein said cell is arranged with respect to said light source so that said incident beam, propagating in a first direction, will arrive through said second cell substrate and exit from said first cell substrate, and
    wherein said cell is configured to provide a beam angular intensity distribution which is flatter for said incident beam propagating in said first direction than for a beam propagating in a second direction opposite to said first direction.

2. The device as defined in claim 1, further comprising at least one primary optics element positioned between said source and said cell to transform the original light divergence before it enters into said cell.

3. The device as defined in claim 2, further comprising a secondary optics element positioned between said cell and the output space.

4. The device as defined in claim 3, wherein said primary optics element is a reflector.

5. The device as defined in claim 4, wherein said secondary optics element is a static diffuser.

6. The device as defined in claim 4, wherein said secondary optics element is a dynamic LC controllable diffuser.

7. The device as defined in claim 1, comprising two said cells cross oriented and arranged with parallel patterns of paired electrodes for modulating two orthogonal polarizations of incident light in one output plane.

8. The device as defined in claim 7, wherein said at least one alignment layer of each one of said cells is arranged at or about at a 45 degree angle with respect to a direction of said pattern of paired electrodes.

9. The device as defined in claim 1, comprising four said cells cross oriented and arranged for modulating two orthogonal polarizations of incident light in two output planes.

10. The device as defined in claim 1, wherein said pattern of paired electrodes comprises parallel strip electrodes.

11. The device as defined in claim 1, wherein said patterned electrode structure is configured to have a specific electrode pitch relative to a thickness of the liquid crystal material filling.

12. The device as defined in claim 1, wherein said cell provides greater beam broadening in said second direction than in said first direction.

13. A beam modulator for use with a lighting device comprising a light source for producing an incident beam, the modulator comprising:
a mounting compatible with said light source for mounting with a first side of said mounting to receive said incident beam;
at least one liquid crystal cell mounted to said mounting for modulating said incident beam as said incident beam propagates therethrough, said liquid crystal cell having:
a first cell substrate having an electrode structure and a second cell substrate without an electrode structure, the first and second cell substrates being separated by a cell thickness,
a liquid crystal material filling, and
at least one alignment layer for ordering said liquid crystal material with a director in an in-plane ground state alignment direction,
wherein the electrode structure comprises a patterned electrode structure having a pattern of paired electrodes for providing a spatially modulated electric field extending into said liquid crystal material; and
wherein said cell is arranged with respect to said light source so that said incident beam, propagating in first direction, will arrive through said second cell substrate and exit from said first cell substrate, and
wherein said cell is configured to provide a beam angular intensity distribution which is flatter for said incident beam propagating in said first direction than for a beam propagating in a second direction opposite to said first direction.

14. The modulator as defined in claim 13, further comprising at least one primary optics element positioned between said source and said cell to transform the original light divergence before it enters into the said cell.

15. The modulator as defined in claim 14, further comprising a secondary optics element positioned between said cell and the output space.

16. The modulator as defined in claim 15, wherein said primary optics element is a reflector.

17. The modulator as defined in claim 16, wherein said secondary optics element is a static diffuser.

18. The modulator as defined in claim 16, wherein said secondary optics element is a dynamic LC controllable diffuser.

19. The modulator as defined in claim 13, comprising two said cells cross oriented and arranged with parallel patterns of paired electrodes for modulating two orthogonal polarizations of incident light in one output plane.

20. The modulator as defined in claim 19, wherein said at least one alignment layer of each one of said cells is arranged at or about at a 45 degree angle with respect to a direction of said pattern of paired electrodes.

21. The modulator as defined in claim 13, comprising four said cells cross oriented and arranged for modulating two orthogonal polarizations of incident light in two output planes.

22. The device as defined in claim 13, wherein said pattern of paired electrodes comprises parallel strip electrodes.

23. The modulator as defined in claim 13, wherein said patterned electrode structure is configured to have a specific electrode pitch relative to a thickness of the liquid crystal material filling.

24. The modulator as defined in claim 13, wherein said cell provides greater beam broadening in said second direction than in said first direction.

* * * * *